US006969469B1

United States Patent
Xie

(10) Patent No.: US 6,969,469 B1
(45) Date of Patent: Nov. 29, 2005

(54) METHOD OF USING WASTE TIRES AS A FILTER MEDIA

(75) Inventor: Yuefeng Xie, Elizabethtown, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 10/049,471

(22) PCT Filed: Aug. 23, 2000

(86) PCT No.: PCT/US00/23155

§ 371 (c)(1),
(2), (4) Date: Feb. 12, 2002

(87) PCT Pub. No.: WO01/14039

PCT Pub. Date: Mar. 1, 2001

Related U.S. Application Data

(60) Provisional application No. 60/150,872, filed on Aug. 26, 1999.

(51) Int. Cl.[7] .............................................. B01D 24/12
(52) U.S. Cl. ...................................... 210/807; 210/290
(58) Field of Search ............................... 210/806, 807, 210/263, 290, 503

(56) References Cited

U.S. PATENT DOCUMENTS

| 4,048,068 A | * | 9/1977 | Hirs ............................. 210/793 |
| 4,172,031 A |   | 10/1979 | Hall et al. .................. 210/679 |
| 4,182,677 A |   | 1/1980 | Bocard et al. ............... 210/680 |
| 4,302,337 A |   | 11/1981 | Larson et al. ............... 210/662 |
| 5,236,597 A | * | 8/1993 | Feist et al. .................. 210/670 |
| 5,595,667 A | * | 1/1997 | Rieber ........................ 210/769 |
| 6,267,882 B1 | * | 7/2001 | Houck et al. ............... 210/170 |
| 2003/0111431 A1 | * | 6/2003 | Dew, Jr. ..................... 210/807 |

* cited by examiner

Primary Examiner—Ivars C. Cintins
(74) Attorney, Agent, or Firm—John J. Elnitski, Jr.

(57) ABSTRACT

The present invention is a method of using crumb rubber from recycled tires as a filter media. The use of crumb rubber as a media differs from conventional sand or anthracite filters in several ways. The crumb rubber media is compressible which allows the porosity between rubber particles to decrease through the filter bed. The crumb rubber media compresses as headloss increases, allowing for better effluent quality late in the run. The crumb rubber media allows greater depth filtration. The crumb rubber media can be used at high filter rates, greater than 20 gpm/ft$^2$. The crumb rubber media performs similarly to other traditional filter media in respect to turbidity and total suspended solids removal. The crumb rubber media properties are closely tied to media size and shape, with smaller media providing better effluent qualities and larger media allowing longer filter runs at higher flow rates.

6 Claims, 5 Drawing Sheets

Crumb Rubber

Figure 1 Porosity distribution in three filters.

Crumb Rubber

- ♦ small cr -10 GPM/ft2
- ▲ large cr - 20 GPM/ft2
- ● dual media -5 GPM/ft2

| Filter Media | Loading gpm/ft² | Influent SS mg/L | Effluent SS mg/L | SS Removal % |
|---|---|---|---|---|
| 10 mesh crumb rubber | 20 | 21.1 | 5.9 | 72.0 |
| 10-16 mesh crumb rubber | 20 | 23.9 | 2.2 | 90.8 |
| 10-16 mesh crumb rubber | 15 | 23.9 | 0.8 | 96.7 |
| 10-16 mesh crumb rubber | 10 | 22.0 | 2.2 | 90.0 |
| Sand/anthracite | 10 | 23.8 | 1.1 | 95.4 |
| Sand/anthracite | 5 | 23.9 | 1.0 | 95.8 | ically caused the top of the filter bed to
METHOD OF USING WASTE TIRES AS A FILTER MEDIA This application claims the benefit of U.S. Provisional Application No. 60/150,872 filed Aug. 26, 1999 and hereby incorporates it by reference.

BACKGROUND

Every year, millions to billions of waste tires need to be disposed. Waste tires are a greater disposal problem than most wastes, because they will not stay buried in landfills. Instead, due to their unique shape, tires tend to trap gases and float to the top of a landfill. Consequently, waste tires are stored in tire piles or dumped illegally. In addition to being unsightly, these tires are a breeding ground for pests, such as mosquitoes or rats. Tire piles are inherently a fire hazard due to a combination of a flammable substance of rubber and excess air being trapped in the tires. Also, oil released from melting rubber can pollute ground or surface waters. These hazards become increasingly significant due to the sheer number of tires to be disposed. One solution to the growing tire problem is to reduce the production of waste tires by purchasing higher mileage tires, purchasing retreaded or remanufactured tires, or performing regular tire maintenance. A second solution is to reuse or recycle waste tires. Crumb rubber, a tire-derived material, is currently being used in highway pavement, athletic track surfaces, playgrounds, landfill liners, compost bulking agents, various manufactured products, energy recovery and artificial reefs for aquatic life. The crumb rubber is produced by chopping up waste tires, cleaning the chopped up rubber and removing any metal particles.

For wastewater filtration, gravity down-flow granular filters are commonly used, whereby sand or anthracite is used as a filter media. One major problem with granular filters is that upon backwashing the particles of media, the larger particles settle at a greater rate than the smaller particles. This ultimately causes the top of the filter bed to hold the smallest particles and the bottom of the filter bed to hold the largest particles, as shown in FIG. 1. This is a problem because the small particles have a less spacing or porosity between particles and this spacing becomes clogged quickly and easily.

It is an object of the present invention to provide an improved filter by using a media for the filter made from waste tires.

SUMMARY OF THE INVENTION

The present invention is method of using crumb rubber from recycled tires as a filter media. The use of crumb rubber as a media differs from conventional sand or anthracite filters in several ways. The crumb rubber media is compressible which allows the porosity between rubber particles to decrease through the filter bed. The crumb rubber media compresses as headloss increases, allowing for better effluent quality late in the run. The crumb rubber media allows greater depth filtration. The crumb rubber media can be used at high filter rates, greater than 20 gpm/ft$^2$. The crumb rubber media performs similarly to other traditional filter media in respect to turbidity and total suspended solids removal. The crumb rubber media properties are closely tied to media size and shape, with smaller media providing better effluent qualities and larger media allowing longer filter runs at higher flow rates. The filter can be a downflow granular filter. The sizes of the crumb rubber particles are 10–16 mesh size or −10 mesh size.

DETAILED DESCRIPTION

The present invention is method of using crumb rubber from recycled tires as a filter media. The use of crumb rubber as a media differs from conventional sand or crumb rubber media, 36 inches, was chosen to be comparable with the dual media filter. Two sizes of crumb rubber were investigated, the first media size of 10–16 mesh and the second size of −10 mesh. The 10–16 mesh particle size is defined by crumb rubber particles sizes that pass through a 10 mesh sieve, but not a 16 mesh sieve. The −10 mesh particle size is defined by crumb rubber particles sizes that do not pass through a 10 mesh sieve. The 10–16 mesh size of crumb rubber tends to be in a ball shape, while the −10 mesh size of crumb rubber tends to be in a bar shape several millimeters in length. Each media was evaluated at several filtration rates ranged from 5 to 20 gpm/ft$^2$. In addition, each media was run with clean water to determine clean bed headloss at several flow rates.

Influent and effluent samples were taken at preset time intervals for turbidity and total suspended solids analysis. Turbidity was measured according to Standard Methods 2540 with a Hach 2100P turbidimeter. Total suspended solids analysis was conducted according to Standard Methods 2130 using Pall 47 mm type A/C glass fiber filters with 47 mm filter funnels. Synthetic wastewater was prepared in the laboratory by diluting mixed liquor from an activated sludge process with tap water. The MLSS, typically 1200 mg/L, was diluted to 20–25 mg/l in a well-mixed tank, then pumped into each pilot filter. Headloss was determined across the filter bed by measuring the water level (static head) in vertical tubes connected to the filter column. The tubes are connected to the filter column starting at the top of the support media and continuing every 6 inches up to the top of the filter media (36 inches above the support media). Headloss was determined by subtracting the static head for each tube from the static head on top of the filter media. Headloss was evaluated as a function of run time and solids accumulation for each media.

Figure 1:
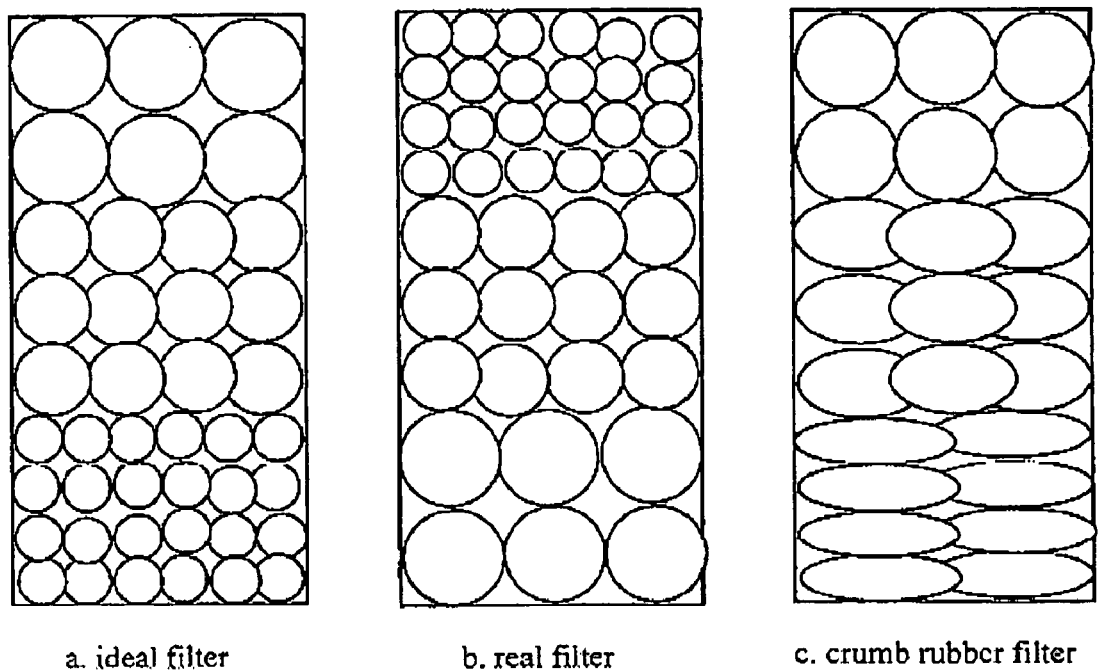
FIG. 1 is a schematic of the positioning of sand or anthracite particles in a filter of the prior art.
Figure 2:
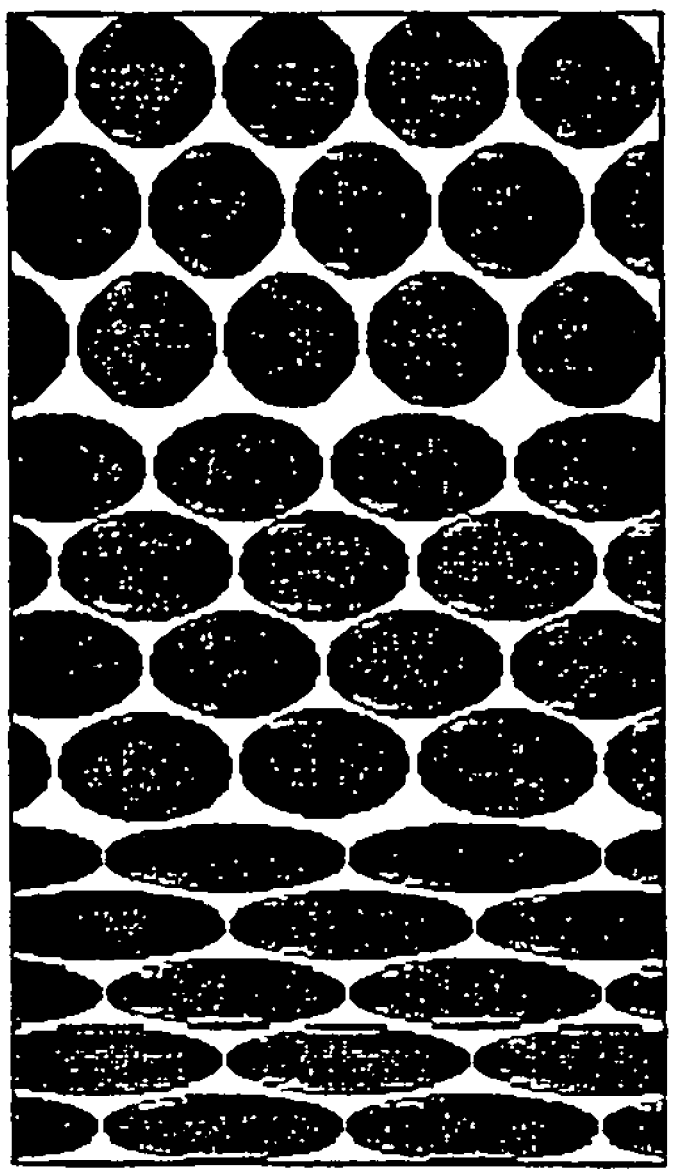
FIG. 2 is a schematic of the positioning of crumb rubber particles in a filter according to the present invention.
Figure 3:
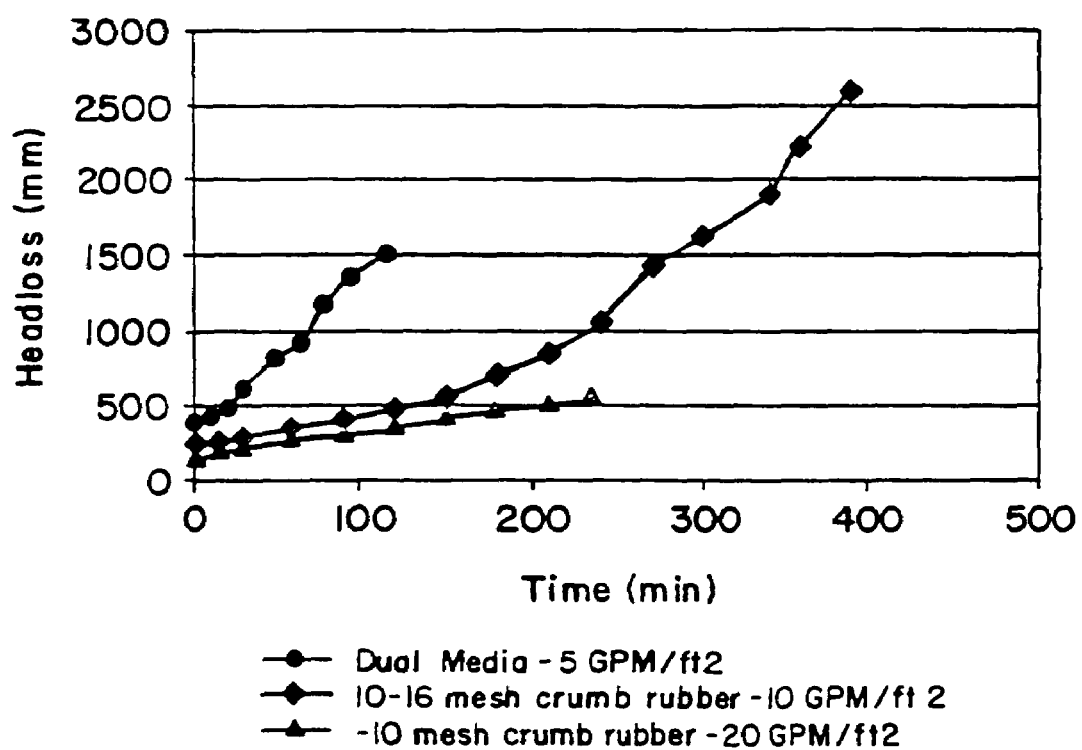
FIG. 3 is a plot of headloss versus time for three media types.

The filter performance of crumb rubber media was compared relative to the performance of dual media by examining bed volume, headloss, solids removal, and run time. To determine the performance of each media type for wastewater filters, an influent-effluent turbidity and total suspended solid analyses were conducted at several flow rates. The comparison presents filter performance for dual, 10–16 mesh, and −10 mesh media at 5, 10, and 20 gpm/ft$^2$ loadings. FIG. 3 demonstrates the effectiveness of crumb rubber media with respect to dual media. It can be easily seen that dual media resulted in greater head losses more quickly, than either size of crumb rubber media, even at a lower hydraulic loading. The dual media filter produces a head loss of 1.5 meter after only 115 minutes, while it takes the 10–16 mesh crumb rubber media 280 minutes to produces this head loss even though the crumb rubber was operated at twice the hydraulic load. The −10 mesh crumb rubber media produced only 0.5 meters of head loss after 235 minutes, about half the headloss of the smaller crumb rubber media during the same run time.

Figure 4:
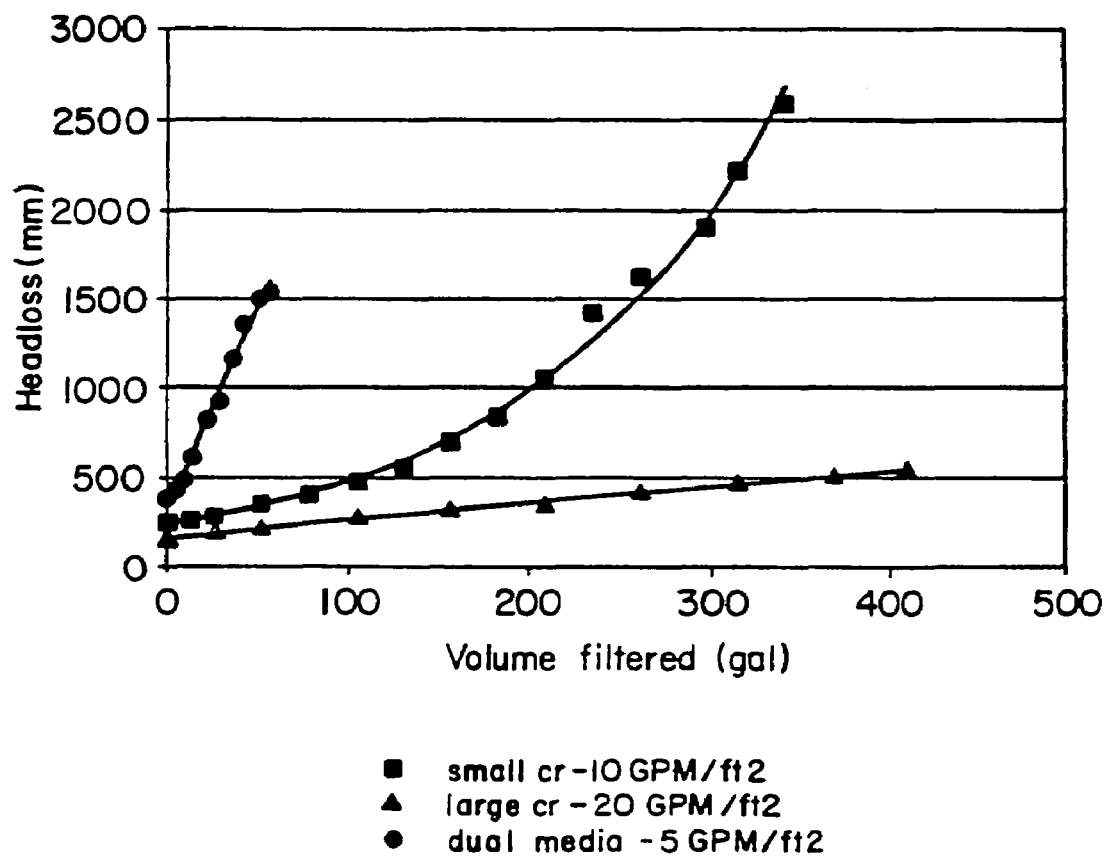
FIG. 4 is a plot of headloss development versus the volume of wastewater filtered for three media types.

The performance of crumb rubber media depends largely on the size of the media used. Head loss is examined as a function of volume filtered and solids accumulation, respectively, as shown in FIG. 4. Using the bed volumes filtered allows a more direct comparison of head loss at different flow rates since it incorporates both time and flow values. The volume of wastewater needed to produce 0.50 meters of headloss for dual, 10–16 mesh crumb rubber, and −10 mesh crumb rubber media are 5, 60, and 180 bed volumes respectively. The 10–16 mesh crumb rubber media can filter 125 gallons of wastewater before a head loss of 1.5 meters was resulted across the filter bed. However, only 26 gallons of wastewater can be filtered with the dual media filter.

Figures 5, 6:
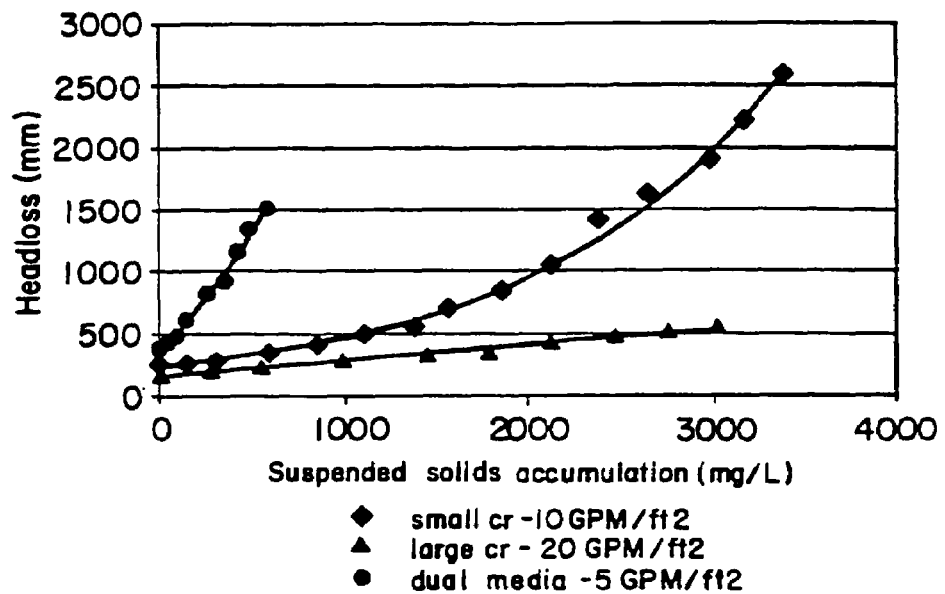
FIG. 5 is a plot of headloss development versus the accumulation of suspended solids in the filter bed for three media types.
FIG. 6 is a table showing suspended solids removal for crumb rubber and dual media at various filter loading rates.

Another interesting parameter is the accumulation of suspended solids on the filter bed with respect to head loss. Media that clogs more quickly has a steeper slope than media that clogs less quickly. It follows that the steeper slope is related to a narrower filtration zone and less depth filtration. By inspection of FIG. 5, it is easily noticed that dual media has a steeper slope than either crumb rubber media and that the smaller crumb rubber media has a steeper slope than the larger crumb rubber media. Suspended solids removal is an important process in successful filtration. This study calculates the percent removal of suspended solids through mass balance calculations of total suspended solids entering and accumulated on the filter. The table shown in FIG. 6 contains data showing the percent removal of suspended solids along with the average effluent suspended solids and volume of water filtered per minute. The removal percentage is greatest for dual media. The similar removal was achieved with 10–16 mesh crumb rubber. The −10 mesh crumb rubber provides the lowest solids removal, but is still adequate for most effluent limits.

Crumb rubber media allows greater depth filtration, longer filter runs, less headloss, and higher filter rates than dual media. Removal efficiency, as expected, was higher for the 10–16 mesh media, while the −10 mesh media allowed longer filter runs with lower removal efficiency. Size and compression characteristics led to greater depth filtration in the crumb rubber media. The majority of the solids removal occurred in the top 12 to 18 inches of media depth in crumb rubber, while dual media trapped solids almost exclusively on the top of the media bed. These characteristics were expected based on the hypothesized porosity gradient of both media types. Because of this, the properties of crumb rubber media allow the filter to be operated for a greater period of time and/or at higher flow rates, even if interstitial flow rates are similar to conventional media. Additionally it was observed that the entire bed height decreased with time, this allowed the porosity to be lowest late in the run, promoting better late run effluent quality.

Another embodiment would be to use the crumb rubber as a media above sand or anthracite media to form a dual media filter. Whereby, the crumb rubber particle size would be larger than the sand or anthracite media. Therefore, the upper crumb rubber layer can remove large solids and reduce the headloss, while the sand or anthracite lower layer can remove the small solids and further polish the water quality.

While different embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention that is to be given the full breadth of any and all equivalents thereof.

What is claimed is:

1. A method of filtering a liquid comprising passing the liquid into a top of a downflow filter such that the liquid passes through a stacked media of crumb rubber particles made from tires and out a bottom of the downflow filter, said downflow filter having a top and a bottom, wherein a flow to be filtered enters said top of said downflow filter and exits said bottom of said downflow filter, and wherein said crumb rubber particles are stacked such that said crumb rubber particles near said bottom of said downflow filter are compressed under weight of said crumb rubber particles stacked towards said top of said downflow filter and porosity between said crumb rubber particles decrease through said down flow filter from said top to said bottom of said downflow filter due to pressure on each of said crumb rubber particles on each other.

2. The method of claim 1, wherein the crumb rubber particles are 10–16 mesh size.

3. The method of claim 1, wherein the crumb rubber particles are −10 mesh size.

4. The method of claim 1, wherein the filter further includes a second filter media below said crumb rubber particles in the filter to act as a dual media filter.

5. The method of claim 4, wherein said second filter media is anthracite.

6. The filter of claim 1, wherein said liquid includes suspended solids which are retained by the porosity of the crumb rubber particles.

* * * * *